United States Patent
Todoroki (10) Patent No.: US 9,014,750 B2
(45) Date of Patent: Apr. 21, 2015

(54) WIRELESS COMMUNICATION DEVICE

(75) Inventor: Toshiya Todoroki, Kanagawa (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 2 days.

(21) Appl. No.: 13/977,852

(22) PCT Filed: Dec. 16, 2011

(86) PCT No.: PCT/JP2011/079156
§ 371 (c)(1),
(2), (4) Date: Jul. 1, 2013

(87) PCT Pub. No.: WO2012/096101
PCT Pub. Date: Jul. 19, 2012

(65) Prior Publication Data
US 2013/0295984 A1    Nov. 7, 2013

(30) Foreign Application Priority Data
Jan. 13, 2011   (JP) ................. 2011-004834

(51) Int. Cl.
H04M 1/00 (2006.01)
H04B 1/04 (2006.01)
H04W 88/02 (2009.01)
H04B 7/04 (2006.01)

(52) U.S. Cl.
CPC ............. H04W 88/02 (2013.01); H04B 7/0452 (2013.01)

(58) Field of Classification Search
CPC ... H04B 7/0413; H04B 7/0452; H04B 7/0404
USPC ............. 455/63.1, 101, 272, 550.1; 370/328, 370/329, 334; 375/260, 267
See application file for complete search history.

(56) References Cited

U.S. PATENT DOCUMENTS 7,327,795 B2 * 2/2008 Oprea ............................ 375/260
7,333,455 B1 * 2/2008 Bolt et al. ...................... 370/334
8,331,308 B1 * 12/2012 Au et al. ........................ 370/330

(Continued)

FOREIGN PATENT DOCUMENTS

JP   2007-140590 A   6/2007
JP   2008-516527 A   5/2008

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3rd Generation Partnership Project, Dec. 2008, pp. 1-82, vol. 8.5.0.

(Continued)

Primary Examiner — Quochien B Vuong
(74) Attorney, Agent, or Firm — Sughrue Mion, PLLC (57) ABSTRACT

A wireless communication device includes: a master terminal that includes an antenna element, an RF circuit, a control unit, and a MIMO processing unit connected with the RF circuit; and a slave terminal that includes an antenna element and an RF circuit. The slave terminal is connected with the master terminal via an interface that includes a high-frequency transmission path. The control unit can control the MIMO processing unit and each RF circuit, and controls the MIMO processing unit to perform a MIMO reception process based on an RF signal that is received by the master terminal and an RF signal that is received by the slave terminal and transmitted to the master terminal.

6 Claims, 4 Drawing Sheets

(56) References Cited

U.S. PATENT DOCUMENTS 8,509,708 B2 * 8/2013 Zhang et al. .................. 455/73
2006/0063494 A1 3/2006 Zhang et al.

FOREIGN PATENT DOCUMENTS

| | | |
|---|---|---|
| JP | 2008-205904 A | 9/2008 |
| WO | 2006/041652 A2 | 4/2006 |
| WO | 2010/146617 A1 | 12/2010 |
| WO | 2011/030803 A1 | 3/2011 |

OTHER PUBLICATIONS

International Search Report for PCT/JP2011/079156, dated Jan. 31, 2012.

* cited by examiner

WIRELESS COMMUNICATION DEVICE

CROSS REFERENCE TO RELATED APPLICATIONS

This application is a National Stage of International Application No. PCT/JP2011/079156 filed Dec. 16, 2011, claiming priority based on Japanese Patent Application No. 2011-004834 filed Jan. 13, 2011, the contents of all of which are incorporated herein by reference in their entirety.

TECHNICAL FIELD

The present invention relates to a wireless communication device that uses a plurality of antenna elements to transmit and receive modulated signals.

BACKGROUND ART

In portable terminals such as portable telephones, it has become common to install a plurality of antenna elements for communication on different frequency bands in several wireless schemes (such as the GSM (Global System for Mobile Communications) mode or WCDMA (Wideband Code Division Multiplex Access) mode according to 3GPP ($3^{rd}$ Generation Partnership Project)). MIMO (Multi-Input/Multi-Output) communication technology that is capable of using space diversity to expand transmission bands is now receiving attention.

MIMO communication is a communication technology in which a plurality of antenna elements are provided on both a transmitting side and receiving side that carry out wireless communication and in which data stream are spatially multiplexed to transmit from the transmitting side to the receiving side. Where M and N are integers equal to or greater than 2, a plurality of transmission data stream are subjected to spatial and temporal encoding for multiplexing, distributed to M transmission antennas, and transmitted on channels on the transmitting side. In contrast, received signals that are received by N reception antennas via channels on the receiving side are subjected to spatial and temporal decoding based on the channel characteristics to separate a plurality of data streams from the received signals. In this way, received data can be obtained without crosstalk between data streams. Ideally, MIMO communication enables a number of independent transmission paths to be obtained that is equal to the number of, among the transmission antennas and reception antennas, the antennas of which there are fewer, i.e., the number represented by $\min\{M, N\}$. This number is called the spatial multiplicity or the spatial multiplexing number. In MIMO communication, the separation of data series is implemented reliably through the low correlation between the antenna elements.

MIMO technology is a technology that, by thus enabling the transmission of different data series from each of a plurality of antenna elements and then separating data series that have been simultaneously transmitted from each of transmitting-side antenna elements on a receiving side that is equipped with a plurality of antenna elements, raises the transmission capacity without expanding the frequency band. According to MIMO technology, transmission capacity can be increased according to the number of antennas. If the signal power is S and the noise power is N, the inherent performance of MIMO communication can be drawn out to its maximum when the SN ratio (the signal-to-noise ratio) is great, such as when the noise power N is low.

The MIMO communication scheme is used in, for example, wireless LAN (Local Area Network) standard IEEE 802.11n, LTE (Long Term Evolution) of UMTS (Universal Mobile Telecommunication System) that is the next-generation mobile communication standards and currently in development in 3GPP ($3^{rd}$ Generation Partnership Project), and in mobile WiMAX that takes the IEEE 802.16e standard as a basis.

However, when the MIMO communication scheme is applied to a compact device such as a portable telephone terminal, the small size of the device body compels the mounting of a plurality of antenna elements in an extremely confined space, thereby complicating the reduction of the correlation among the antenna elements which severely affects the inherent performance of MIMO communication.

The MIMO communication scheme is described in greater detail hereinbelow. The MIMO communication scheme is here described for a case in which the number of transmission antennas is two and the number of reception antennas is two, i.e., 2×2 MIMO. In addition, a link by which signals are transmitted from a base station to a portable terminal is referred to as a downlink, and a link by which signals are transmitted from a portable terminal to a base station is referred to as an uplink.

Figure 1:
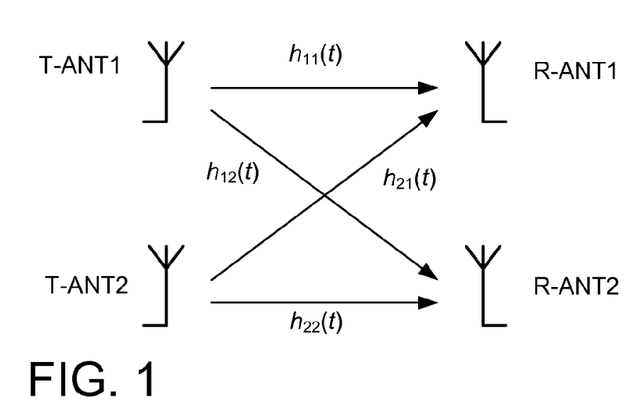
FIG. 1 is a view showing the operation principles of MIMO.

As shown in FIG. 1, when data series A (not shown) and data series B (not shown) are transmitted simultaneously from two transmission antennas T-ANT1 and T-ANT2, respectively, each of two reception antennas R-ANT1 and R-ANT2 receives a different data series in which each of data series A and data series B have been multiplexed. Because two antennas have been provided for each of transmission antennas and reception antennas, four (=2×2) wireless channels are formed between the transmitting side and receiving side. In the figure, these wireless channels are indicated by arrows. On the receiving side, data series A and data series B that have arrived on the receiving side from the two transmission antennas T-ANT1 and T-ANT2 are separated by estimating the channel fluctuation, i.e., channel transfer functions $h_{11}(t)$, $h_{12}(t)$, $h_{21}(t)$ and $h_{22}(t)$ in these four channels. In order to enable unique identification of the data series from each transmission antenna on the receiving side and to enable the estimation of channel fluctuation $h_{11}(t)$, $h_{12}(t)$, $h_{21}(t)$ and $h_{22}(t)$, a pilot signal is embedded in the transmission data series from each transmission antenna.

It is here assumed that when the number of transmitting-side antennas is T and the number of receiving-side antennas is R, the configuration is represented by "T×R." According to the specifications of 3GPP LTE, 2×2, 4×2 and 4×4 configurations are defined as the configurations of MIMO that are used in downlink data transmission. Accordingly, in an LTE portable terminal to which MIMO technology has been applied, two or four antenna elements must be installed within the terminal.

However, if λ is the wavelength in free space of the frequencies used in communication, antenna elements in a terminal must be separated by at least λ/2 in order to render the reduction in performance negligible in MIMO communication. In consideration of this condition, the installation of two or more antenna elements for MIMO communication inside the case of a portable terminal requires still more space within the portable terminal. The installation of four antenna elements in a portable terminal is particularly difficult.

Because a portable terminal generally already has a plurality of antenna elements for different communication schemes as previously described, mounting a plurality of antennas for MIMO use in such a portable terminal necessitates not only the provision of a plurality of antenna elements in an extremely confined space but also an increase in the size of the portable terminal to both prevent interference between the antenna elements and maintain low correlation. When the 2×2 MIMO communication scheme is to be applied, the addition of still more antenna elements to the portable terminal to bring out the inherent capabilities of MIMO communication is problematic.

Then JP-A-2008-205904 (Patent Literature 1) discloses the use of a plurality of portable terminals and causing these terminals to operate in synchronization in order to enable uplink MIMO communication. Because the stream is merely divided and transmitted from different antenna elements on the transmitting side, the use of a plurality of portable terminals as the transmitting side in MIMO communication is easy. However, JP-A-2008-205904 (Patent Literature 1) makes no disclosure regarding the configuration that is necessary for using a plurality of portable terminals to implement MIMO communication as the receiving side that requires complex processing such as the estimation of channels and the separation of the stream. JP-A-2007-140590 (Patent Literature 2) discloses an example of a communication system in which synchronous control is realized regarding the operation of processing among a plurality of communication terminal devices.

CITATION LIST

Patent Literature(s)

Patent Literature 1: JP-A-2008-205904
Patent Literature 2: JP-A-2007-140590

Non-Patent Literature(s)

Non-Patent Literature 1: 3GPP TS36.211 V8.5.0, $3^{rd}$ Generation Partnership Project, December 2008.

SUMMARY OF THE INVENTION

Problem to be Solved by the Invention

It is an object of the present invention to provide a wireless communication device that uses a plurality of antenna elements to utilize the space diversity of wireless channels, that easily allows increase of the number of antenna elements even when there is no space for a plurality of built-in antennas or when securing space for the further addition of built-in antenna elements is problematic, that improves the quality of data reception by the MIMO communication scheme, and that can achieve an increase in transmission capacity. The quality of data reception here mentioned includes, for example, the error rate of transmission information or the rate of occurrence of communication disconnections.

Means for Solving the Problem

The wireless communication device according to the present invention is a wireless communication device that communicates with a base station and that includes a plurality of terminals each including an antenna element and an RF circuit, one of the plurality of terminals being a master terminal and the remaining terminal being a slave terminal, wherein each slave terminal is connected to the master terminal by an interface that includes at least a high-frequency transmission path, wherein the master terminal is equipped with a control unit and a MIMO processor, and wherein the control unit is capable of controlling the MIMO processor and the RF circuit of the master terminal and the RF circuit of each the slave terminal and causes the MIMO processor to execute MIMO reception processing based on the RF signal that is received by the antenna element of the master terminal and the RF signal that is received by the antenna element of each the slave terminal and transmitted in to the master terminal by way of the high-frequency transmission path.

According to the present invention, the ability to use an antenna element equipped in a slave terminal when carrying out reception in the MIMO communication scheme enables an increase of the spatial multiplexing number, and further enables, for example, an improvement in transmission capacity and an improvement of the quality of data communication.

DESCRIPTION OF THE EMBODIMENTS

Recently, many users of portable telephones own and selectively use a plurality of portable telephones according to different purposes such as portable telephones used for communicating among family members and portable telephones used for other purposes. If one user is assumed to possess a plurality of portable terminals of which portable telephones are representative, the use of these portable terminals as an single wireless communication device can raise transmission capacity through the use of the MIMO communication scheme.

It is here assumed that all of the n portable terminals possessed by a user can be used in the MIMO communication scheme, n being an integer equal to or greater than 2. In addition, a portable terminal may have the MIMO capability by itself. In a wireless communication device based on the present invention, one of this plurality of portable terminals is the master terminal, and the remaining portable terminals are slave terminals that are controlled from the master terminal, all of the master terminal and the slave terminals together being seen from a base station as constituting a single MIMO terminal.

Figure 2A:
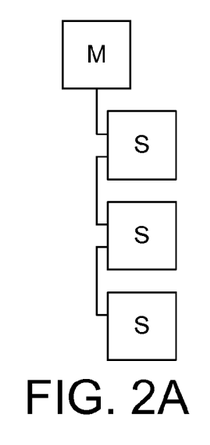
FIG. 2A is a view showing an example of the connection configuration of a master terminal and slave terminals.
Figure 2B:
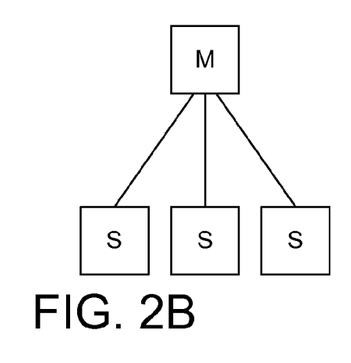
FIG. 2B is a view showing an example of the connection configuration of a master terminal and slave terminals.
Figure 2C:
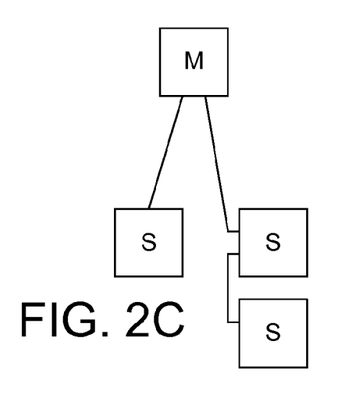
FIG. 2C is a view showing an example of the connection configuration of a master terminal and slave terminals.

Various configurations can be considered as the connection configuration of a master terminal and slave terminals, and examples of these configurations are shown in FIGS. 2A to 2C. FIG. 2A shows a daisy-chain connection in which slave terminals are connected in a straight chain with the master terminal as one end. FIG. 2B shows one-to-many connection in which each of a plurality of slave terminals is directly connected to the master terminal. FIG. 2C shows a connection in which a daisy-chain connection and a one-to-many connection are combined. Whether the connection configuration is different than those shown in FIGS. 2A to 2C, any connection configuration can be adopted as long as the entirety of the connected master terminal and slave terminals can be caused to function as one MIMO.

The interfaces between terminals are configured to allow transmission of control signals for control of each slave terminal by the master terminal and high-frequency signals (RF signals) that are sent to the master terminal from each slave terminal. Here, the RF signals are RF signals as they were received at the antenna elements of the slave terminals or RF signals that are obtained by subjecting RF signals as they were received at antenna elements to a filtering process or low-noise amplification in the slave terminals. These RF signals are transmitted to the master terminal from the slave terminals by means of high-frequency transmission paths such as coaxial cables.

In a wireless communication device in which this configuration is adopted, the number of receiving-side antennas is substantially increased while using the antenna elements that are incorporated in the slave terminals and hardware in the slave terminals to thus enable configuration of a MIMO communication terminal of a higher-order than the order of MIMO communication in each individual terminal, whereby an even greater increase of the transmission capacity of data can be achieved. Examples of the hardware in the slave terminals includes, for example, filter processing circuits and low-noise amplification circuits.

Figure 3:
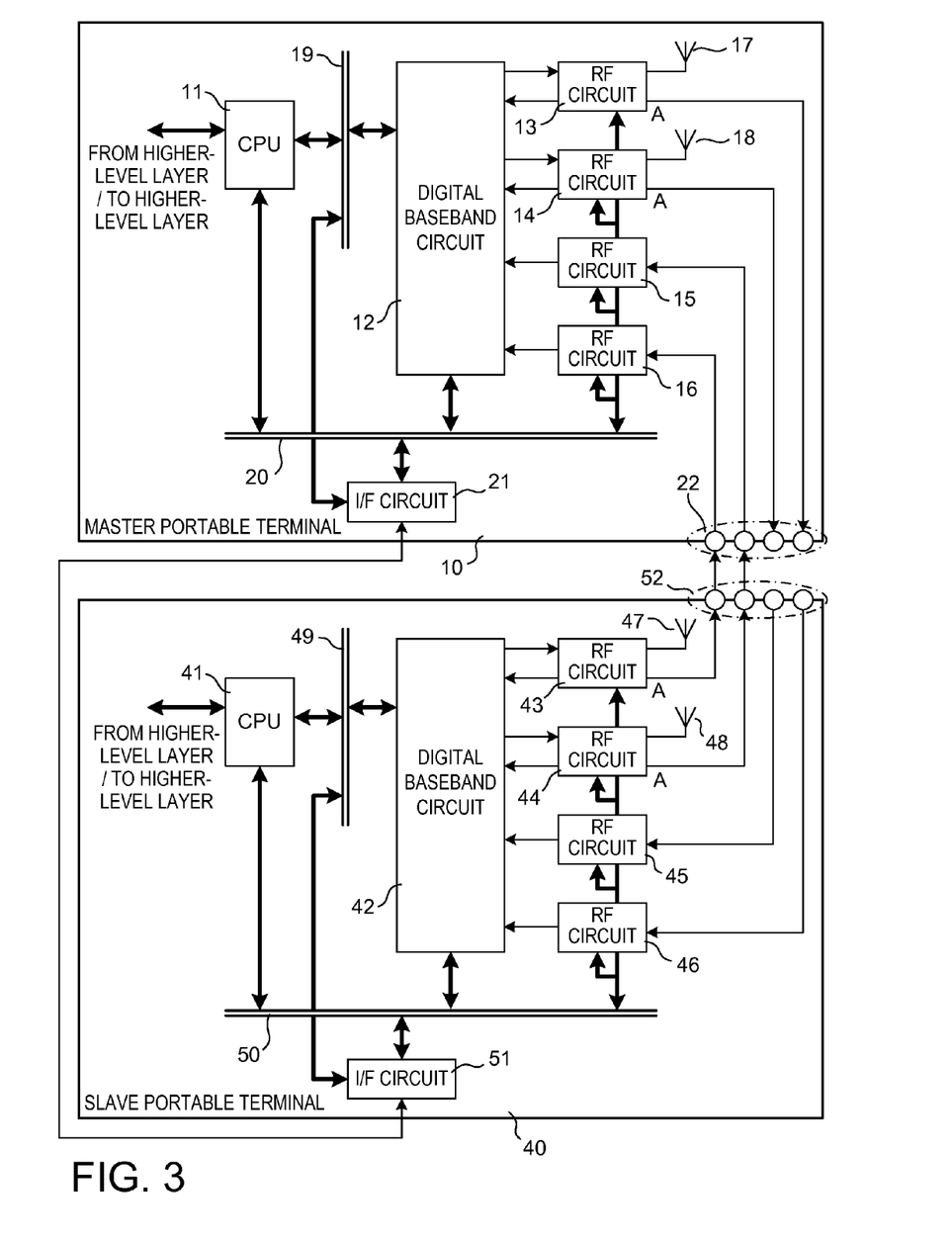
FIG. 3 is a block diagram showing the configuration of the wireless communication device according to an exemplary embodiment of the present invention.

FIG. 3 shows an example of the configuration of the above-described wireless communication device that is an exemplary embodiment of the present invention. Here, a configuration is described that enables 4×4 MIMO communication using master portable terminal 10 that is the master terminal and slave portable terminal 40 that is a slave terminal. Master portable terminal 10 and slave portable terminal 40 are portable communication terminals that have equivalent functions, that have 2×2 MIMO communication functions that are applied to a particular wireless communication scheme, and that are able to communicate with a base station that handles MIMO communication in conformity with the particular wireless communication scheme.

Master portable terminal 10 is equipped with two antennas 17 and 18 to enable downlink 2×2 MIMO operation, and the slave terminal is similarly equipped with two antennas 47 and 48 for downlink 2×2 MIMO communication.

Master portable terminal 10 is further equipped with: CPU 11 that implements the overall control of master portable terminal 10 and that further carries out processing to be described relating to slave portable terminal 40; digital baseband circuit 12 that carries out digital signal processing relating to baseband signals; RF circuits 13 to 16 that carry out processing relating to high-frequency signals; data bus 19; control bus 20; I/F (Interface) circuit 21 that interfaces with slave portable terminal 40; and coaxial connector group 22 for exchanging RF signals with slave portable terminal 40. Digital baseband circuit 12 functions as a MIMO processor that executes processing on baseband signals that is necessary for MIMO communication. CPU 11 carries out exchange of data with higher-level layers such as applications and connects with data bus 19 and control bus 20. Data bus 19 is further connected to digital baseband circuit 12 and I/F circuit 21, and control bus 20 is further connected to digital baseband circuit 12, RF circuits 13 to 16, and I/F circuit 21.

RF circuits 13 and 14 are connected to digital baseband circuit 12, are provided with the capability to carry out transmission/reception processing for transmitting and receiving RF signals with a base station, and are connected to antennas 17 and 18, respectively. In contrast, RF circuits 15 and 16 are provided with only the capability to carry out reception processing of RF signals that are received as input from slave portable terminal 40 and are also connected to digital baseband circuit 12.

Slave portable terminal 40 is a device of similar configuration to master portable terminal 10 and is equipped with: CPU 41; digital baseband circuit 42; RF circuits 43 to 46, data bus 49; control bus 50; and I/F circuit 51. Here, CPU 41 carries out the overall control of slave portable terminal 40, but is configured to be able to control slave portable terminal 40 according to control from CPU 11 of master portable terminal 10. In addition, I/F circuit 51 interfaces with master portable terminal 10 and is connected with I/F circuit 21 of master portable terminal 10 by means of a digital signal line. Control data for controlling slave portable terminal 40 and a data stream that is to be transmitted to the base-station side from slave portable terminal 40 are sent from master portable terminal 10 to slave portable terminal 40 by means of this digital signal line.

RF circuits 43 and 44 are connected to digital baseband circuit 42 and are equipped with a capability to carry out transmission and reception processing for transmitting and receiving RF signals with a base station, each being connected to antennas 47 and 48, respectively. RF circuits 45 and 46 are equipped with only the capability to carry out reception processing and are also connected to digital baseband circuit 42.

Figure 4:
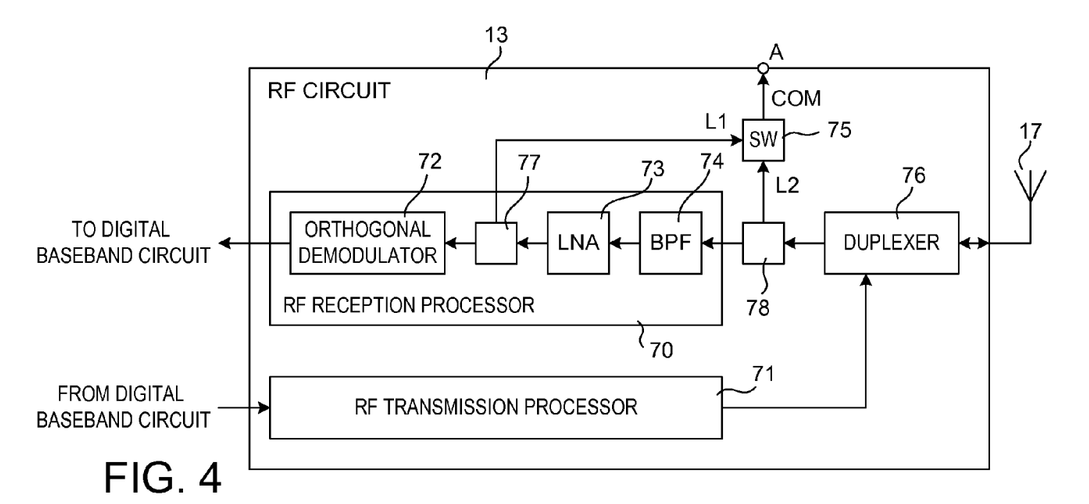
FIG. 4 is a block diagram showing an example of the configuration of an RF circuit.

RF circuits 13, 14, 43 and 44 are of the same circuit configuration, and the circuit configuration of these circuits is here described taking RF circuit 13 (or 43) as representative. As shown in FIG. 4, RF circuit 13 (43) is equipped with: RF reception processor 70 that carries out reception processing for RF an signal received by antenna 17 (47) and supplies the resultant baseband signal to digital baseband circuit 12 (42); RF transmission processor 71 that carries out transmission processing based on the transmission baseband signal from digital baseband circuit 12 (42) and generates a transmission RF signal to be transmitted from antenna 17 (47); and duplexer 76 that is provided between antenna 17 (47) and RF reception processor 70 and RF transmission processor 71 for sharing use of the antenna in transmission and reception. RF circuit 13 is further equipped with: analog switch (SW) to be described; and divider 78 that is provided between duplexer 76 and RF reception processor 70.

RF reception processor 70 is equipped with: band-pass filter (BPF) 74 that carries out a filtering process of a RF signal received as input from duplexer 76 by way of divider 78; low-noise amplifier (LNA) 73 that amplifies the output signal of band-pass filter 74; divider 77 that is connected to the output of low-noise amplifier 73; and orthogonal demodulator 72 that carries out orthogonal demodulation of the signal supplied from low-noise amplifier 73 by way of divider 77 to generate an analog baseband signal and that further subjects the analog baseband signal to analog-to-digital conversion and supplies the result of the conversion to digital baseband circuit 12 as a digital baseband signal.

Analog switch 75 is equipped with two input ports L1 and L2 and one common port COM and is configured as a switch that selects either of input ports L1 and L2 and supplies the signal to the selected input port to common port COM. An RF signal from duplexer 76 that has been branched by divider 78 is supplied to input port L1, another RF signal that has passed via low-noise amplifier 73 and that has been branched by divider 77 is supplied to input port L2, and the two supplied RF signals are switched to be supplied from common port COM to output port A that is provided in RF circuit 13 (43).

When this portable terminal is used as a slave terminal, output port A is connected to one coaxial connector that is included in coaxial connector group 22 (52) for connection to another portable terminal that functions as the master terminal.

In RF circuit 13 (43), the RF signal received at antenna 17 (47) passes by way of duplexer 76 and is branched by divider 78 with one branch being supplied to input port L1 of analog switch 75 and the other branch being supplied to RF reception processor 70. The RF signal applied as input to RF reception processor 70 is subjected to a filtering process at band-pass filter 74, amplified by low-noise amplifier 73, and branched by divider 77. The RF signal from one output of divider 77 is converted to an analog baseband signal and further converted to a digital baseband signal by orthogonal demodulator 72 and supplied to digital baseband circuit 12 (42), and the RF signal from the other output of divider 77 is supplied to input port L2 of analog switch 75. Analog switch 75 is controlled by control signals on control bus 20 (50), and the output of analog switch 75 is supplied from RF circuit 13 (43) by way of output port A.

Figure 5:
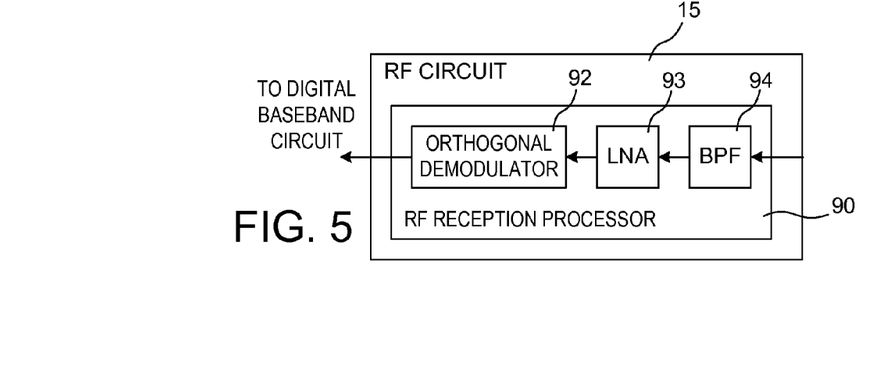
FIG. 5 is a block diagram showing an example of the configuration of another RF circuit.

RF circuits 15, 16, 45 and 46 that are equipped with only reception processing capability are of the same circuit configuration, and the circuit configuration of these components is here described taking RF circuit 15 (or 45) as representative. As shown in FIG. 5, RF circuit 15 (or 45) is equipped with RF reception processor 90 that carries out reception processing of an RF signal received as input from a coaxial connector that is included in coaxial connector group 22 (52). RF reception processor 90 is equipped with: band-pass filter 94 that carries out a filtering process of an RF signal that is received as input; low-noise amplifier 93 that amplifies the output signal of band-pass filter 94; and orthogonal demodulator 92 that carries out orthogonal demodulation of the signal supplied from low-noise amplifier 93 to generate an analog baseband signal and further subjects the analog baseband signal to analog-to-digital conversion to supply the result to the digital baseband circuit as a digital baseband signal.

In RF circuit 15 (45), an RF signal applied as input to RF reception processor 90 is subjected to a filtering process by band-pass filter 94, amplified by low-noise amplifier 93, converted to an analog baseband signal and further converted to a digital baseband signal by orthogonal demodulator 92, and supplied to digital baseband circuit 12 (42).

RF circuits 15, 16, 45 and 46 that are provided with only the reception processing capability are not considered necessary when carrying out 2×2 MIMO communication that uses only one portable terminal, but are necessary for carrying out 4×4 MIMO communication that uses two portable terminals, i.e., master portable terminal 10 and slave portable terminal 40. In this exemplary embodiment, RF signals from output ports A of RF circuits 43 and 44 of slave portable terminal 40 are applied as input to RF circuits 15 and 16, respectively, in order to carry out 4×4 MIMO communication, and coaxial connectors within coaxial connector group 52 and coaxial connectors within coaxial connector group 22 are connected by coaxial cables to enable supply of these RF signals.

The operation of the wireless communication device of the present exemplary embodiment is next described taking as an example a case of downlink according to the above-described LTE specifications.

When master portable terminal 10 is independently carrying out 2×2 MIMO communication, RF circuits 13 and 14 implement processing such as filtering, low-noise amplification, and synchronous detection of input RF signals that are received at antennas 17 and 18, and the output of RF circuits 13 and 14 is applied as input to digital baseband circuit 12. Digital baseband circuit 12 uses a multi-antenna method to carry out processing such as the estimation of each channel, separation and demodulation of signals that have undergone spatial multiplexing, combining of data that have been divided for each antenna, and channel decoding. The output of digital baseband circuit 12 is sent to a higher-level layer through CPU 11 via data bus 19.

A case in which 4×4 MIMO communication is carried out using master communication terminal 10 and slave communication terminal 40 is next described.

4×4 MIMO communication is carried out such that only the existence of master portable terminal 10 is known from the base station. This state is achieved by, for example, having only master portable terminal 10 respond to control signals on a control channel that are sent from the base station. Master portable terminal 10 then issues a request to the base station for transition to 4×4 MIMO communication from the 2×2 MIMO communication that was in use to this point. This request is sent to the base station from master portable terminal 10 as the request "desire for functional improvement," and the base station that has received this request grants master portable terminal 10 the right to examine the functions of other portable terminals, in the example shown here, slave portable terminal 40. When this right has been granted, master portable terminal 10 examines and verifies the functions of slave portable terminal 40, and as a result, master portable terminal 10 communicates to the base station that "capability of master portable terminal 10 has been improved." For example, information indicating that "4×4 MIMO communication capability has been provided to master portable terminal 10" is communicated to the base station. The base station, having received this information, starts downlink data communication by 4×4 MIMO. Master portable terminal 10 and slave portable terminal 40 may of course be started up in a state that is set to perform 4×4 MIMO communication and may be recognized from the base station as terminals equipped with the capability for 4×4 MIMO communication from the start.

Figure 6:
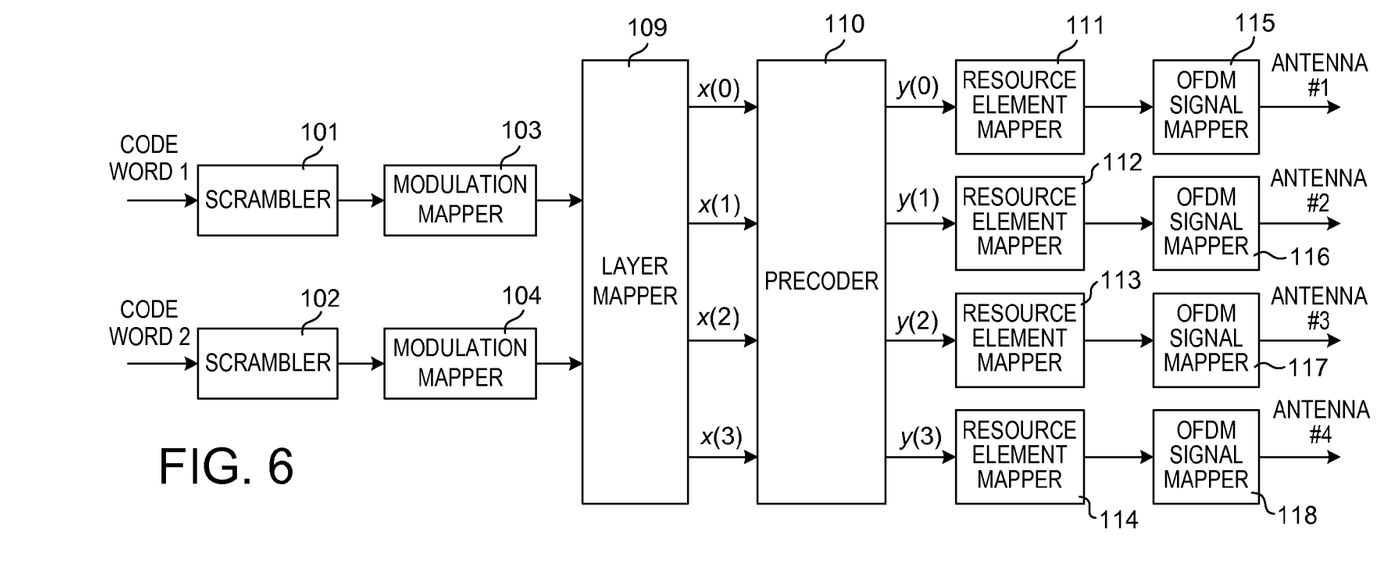
FIG. 6 is a block diagram showing the circuit configuration for baseband signal generation in MIMO transmission on LTE downlink.

The configuration for 4×4 MIMO downlink communication in the base station is first described. FIG. 6 shows the configuration for baseband signal generation in downlink MIMO transmission that is described in FIG. 6.3-1 of 3GPP TS36.211 V8.5.0 (Non-Patent Literature 1) that shows the LTE specifications. Here, the processing from the end of channel coding up to before the transmission RF circuit is shown.

After channel coding, generated code word 0 and code word 1 are applied as input to scramblers 101 and 102, and scrambling of the code words, i.e., randomization of the data, is executed. The outputs of scramblers 101 and 102 are applied as input to modulation mappers 103 and 104, respectively, and modulated by one of QPSK (Quadrature Phase Shift Keying), 16QAM (16 Quadrature Amplitude Modulation), and 64QAM. Two modulated symbol series, which are the outputs of modulation mappers 103 and 104, are applied as input to layer mapper 109 and these modulated symbol series are distributed among the four series x(0), x(1), x(2) and x(3). The output series x(0), x(1), x(2) and x(3) are next applied as input to precoder 110.

In precoder 110, four series y(0), y(1), y(2) and y(3) are obtained by the conversion $[y(0)\ y(1)\ y(2)\ y(3)]^T = W \cdot [x(0)\ x(1)\ x(2)\ x(3)]^T$. Here, W is a precoding matrix of four rows and four columns, and the superscript "T" indicates the transposition of the matrix. Series y(0), y(1), y(2) and y(3) are each embedded in predetermined positions by resource element mappers 111 to 114, and converted to OFDM signals by OFDM (Orthogonal Frequency Division Multiplex) signal mappers 115 to 118. The outputs of OFDM signal mappers 115 to 118 are sent to corresponding antennas by way of high-frequency circuits (RF circuits), respectively.

This signal generation is implemented within the base station device, and the OFDM signals obtained by the signal generation are converted to RF signals of the same desired carrier frequency in each of the RF circuits. The RF signals are then transmitted as electromagnetic waves from four antennas of the base station.

The RF signals sent from the base station antennas are received by antennas 17 and 18 in master portable terminal 10 and applied as input to RF circuits 13 and 14 and received by antennas 47 and 48 in slave portable terminal 40 and applied as input to RF circuits 43 and 44. At this time, CPU 11 is controlling digital baseband circuit 12, RF circuits 13 to 16, and I/F circuit 21 by way of control bus 20. In addition, because I/F circuit 21 is connected to I/F circuit 51 of slave portable terminal 40 and control data can be exchanged between master portable terminal 10 and slave portable terminal 40, CPU 11 of master portable terminal 10 is also controlling digital baseband circuit 42, RF circuits 43 and 44, and I/F circuit 51 of slave portable terminal 40 by way of CPU 41 and control bus 50 of slave portable terminal 40.

In master portable terminal 10, RF circuits 13 and 14 subject RF signals received at antennas 17 and 18 to processes such as filtering, low-noise amplification, and synchronous detection, and the outputs of RF circuits 13 and 14 are applied as input to digital baseband circuit 12.

On the other hand, in slave portable terminal 40, operations differ according to which of input ports L1 and L2 is selected by analog switch 75 in RF circuits 43 and 44.

When the level of the RF signals received at antennas 47 and 48 is lower than a predetermined value, the RF signals are to be amplified by low-noise amplifiers 73 in RF circuits 43 and 44 before being sent to master portable terminal 10. For this reason, CPU 11 of master portable terminal 10 instructs CPU 41 of slave portable terminal 40 to select input port L2 in analog switch 75 in RF circuits 43 and 44 and place RF circuits 43 and 44 in the low input level operation mode. As a result, an RF signal received at antenna 47 of slave portable terminal 40 is applied as input to RF circuit 43, and in RF circuit 43, the RF signal is applied as input to RF reception processor 70 by way of duplexer 76 and divider 78, subjected to a filtering process in band-pass filter 74, amplified by low-noise amplifier 73, and supplied by way of divider 77 and analog switch 75 to output port A of RF circuit 43. The amplified RF signal is supplied to RF circuit 16 of master portable terminal 10 by way of coaxial connector group 42, a coaxial cable that is connected to the outside, and coaxial connector group 22. Similarly, an RF signal received at antenna 48 is amplified by a similar process and applied as input to RF circuit 15. RF circuits 15 and 16 carry out processing similar to the case for RF circuits 13 and 14 and supply digital baseband signals to digital baseband circuit 12. In this way, RF signals that are received at antennas 17, 18, 47 and 48 are converted to digital baseband signals by RF circuits 13 to 16 and applied as input to digital baseband circuit 12, and in digital baseband circuit 12, 4×4 MIMO reception processing is executed that is processing of the reverse flow of the 4×4 MIMO transmission processing shown in FIG. 6 to obtain reception channel coded data. The obtained reception channel coded data are sent to a higher-level layer by way of CPU 11.

On the other hand, when the level of RF signals received at antennas 47 and 48 is higher than the predetermined value, these RF signals are transmitted to the master portable terminal 40 side without being amplified in slave portable terminal 40. In this case, CPU 11 of master portable terminal 10 directs CPU 41 of slave portable terminal 40 to select input port L1 in analog switch 75 in RF circuits 43 and 44 and to place RF circuits 43 and 44 in the high input level operation mode. As a result, an RF signal received at antenna 47 of slave portable terminal 40 is supplied without alteration to output port A of RF circuit 43 by way of duplexer 76, divider 78, and analog switch 75 in RF circuit 43. This RF signal is supplied by way of coaxial connector group 42, a coaxial cable, and coaxial connector group 22 to RF circuit 16. Similarly, an RF signal received at antenna 48 is applied as input to RF circuit 15 by a similar process and without being amplified. RF circuits 13 to 16 then convert the RF signals that were received at antennas 17, 18, 47 and 48 to digital baseband signals and supply the result to digital baseband circuit 12, and digital baseband circuit 12 executes 4×4 MIMO reception processing that is processing of the reverse flow of the 4×4 MIMO transmission processing shown in FIG. 6 to obtain reception channel coded data. The obtained reception channel coded data are sent by way of CPU 11 to a higher-level layer.

When the question of whether to amplify RF signals in slave portable terminal 40 can be fixed, manual settings may be effected directly to slave portable terminal 40 such that either of input ports L1 and L2 of analog switch 75 is selected instead of controlling analog switch 75 by an instruction from CPU 11. When carrying out the manual settings to slave portable terminal 40, the need for control via I/F circuit 21 and I/F circuit 51 relating to downlink 4×4 MIMO reception can be eliminated.

When slave portable terminal 40 is performing slave operations, received RF signals need not be converted to digital baseband signals. Accordingly, in place of dividers 77 and 78, two analog switches may be used that are controlled such that RF signals are caused to flow to master portable terminal 10 by operations similar to those described hereinabove. In this case, the two analog switches that replace dividers 77 and 78 can be controlled by signals that control analog switch 75.

A case is next described in which uplink 4×4 MIMO communication is carried out in the wireless communication device of the present exemplary embodiment. When uplink transmission is carried out, transmission data are divided into two data streams by CPU 11 of master portable terminal 10, one data stream being sent to digital baseband circuit 12 and the other data stream being sent to digital baseband circuit 42 of slave portable terminal 40 by way of I/F circuits 21 and 51. Digital baseband circuit 12 of master portable terminal 10 further divides the data stream that has been sent in into two data streams and supplies each to RF circuits 13 and 14, respectively, and RF circuits 13 and 14 carry out RF transmission processing to send transmission RF signals to the base station from antennas 17 and 18. Similarly, digital baseband circuit 42 of slave portable terminal 40 further divides the data stream sent in from master portable terminal 10 into two data streams and supplies each to RF circuits 43 and 44, respectively, and RF circuits 43 and 44 carry out RF transmission processing to send transmission RF signals to the base station from antennas 47 and 48.

As described hereinabove, by connecting two portable terminals each having 2×2 MIMO communication capability, the present exemplary embodiment allows the number of antenna elements that are used in MIMO communication to be easily increased, enables a larger spatial multiplexing number, and can achieve an increase in the data transmission capacity.

The configuration shown in FIG. 3 uses two portable terminals of identical configuration and allows the free determination of which portable terminal is to be the master portable terminal and which is to be a slave portable terminal, the relation between the two portable terminal being symmetrical. Accordingly, during call connection or during a break in call connection, roles can be switched between the portable terminals, for example, making the master portable terminal the slave portable terminal or making the slave portable terminal the master portable terminal, by the control of CPU 11 or CPU 41. When switching of roles between portable terminals is scheduled, the output ports A of RF circuits 43 and 44 must each be connected to the inputs of RF circuits 16 and 15, respectively, and the output ports A of RF circuits 13 and 14 must each be connected to the inputs of RF circuits 46 and 45, respectively, by way of coaxial connector groups 22 and 52 and coaxial cables of outside connections. In addition, when the portable terminal used as master portable terminal 10 is fixed and the portable terminal used as slave portable terminal 40 is fixed, i.e., when a non-symmetrical configuration is permitted, RF circuits 45 and 46 need not be provided in slave portable terminal 40.

In the foregoing explanation, a device of 2×2 MIMO communication configuration having two transmission-side antennas and two reception-side antennas is used as master portable terminal 10, and 2×2 MIMO communication can be carried out using only master portable terminal 10. However, as described hereinabove, master portable terminal 10 and slave portable terminal 40 can be connected, and one antenna (i.e., antenna 17 or antenna 18) in master portable terminal 10 and one antenna (i.e., antenna 47 or antenna 48) in slave portable terminal 40 can be used to realize a configuration that carries out 2×2 MIMO communication. In this case, the spacing between the two antennas can be increased, the correlation between antennas can be reduced, and the transmission capacity can be increased compared to a case in which 2×2 MIMO communication is carried out by one portable terminal. In addition, due to the increase in the diversity effect, an improvement of the quality of data communication can be achieved.

The present invention is not limited to the above-described exemplary embodiments. Increasing the number of slave portable terminals to two or more enables a further increase of the number of antenna elements that participate in MIMO communication, enables a further increase in the spatial multiplexing number, and can achieve an improvement in the quality of data communication and an improvement in transmission capacity. Configurations of the connection between a master portable terminal and two or more slave portable terminals include, for example, a daisy-chain configuration in which slave portable terminals are connected by being strung together, a one-to-many connection configuration in which each slave portable terminal is directly connected to the master portable terminal, and further, a configuration in which the daisy-chain configuration and the one-to-many configuration are combined. The previously described FIGS. 2A to 2C show examples of connection configurations when connecting one master portable terminal with three slave portable terminals. Here, the master portable terminal is represented by "M" and the slave portable terminals are represented by "S." FIG. 2A shows connection by the daisy-chain configuration, FIG. 2B shows connection by the one-to-many (in this case, one-to-three) configuration, and FIG. 2C shows connection in which the daisy-chain connection and one-to-many connection are combined.

According to the present invention, the spacing between the antenna elements of a master portable terminal and the antenna element of a slave portable terminal can be made greater than for a case in which these antenna elements are incorporated in a single portable terminal, whereby the correlation between antenna elements can be suppressed to a low level. Accordingly, the theoretical maximum performance in MIMO communication can be drawn out.

The present invention as described above is not limited to 2×2 MIMO standardly equipped with terminal devices based on 3GPP LTE but can also be similarly applied to a communication system having a 4×4 MIMO, which is estimated to have the maximum number in IEEE 802.11n, or an even higher-order MIMO communication processor. A compact apparatus used as a slave portable terminal can also carry out high-quality data communication by a communication scheme other than MIMO communication that carries out communication using a plurality of antenna elements, such as selection diversity, combining diversity, or STBC (Space Time Block Coding).

The present invention as described above can also be applied to fields such as 3GPP LTE, mobile WiMAX (IEEE 802.16e), and wireless LAN (IEEE 802.11n) in each of which MIMO communication mode is applied. When applied to a wireless LAN, the present invention may be applied to a plurality of subordinate station terminals (for example, wireless LAN cards) that are connected to a wireless LAN key station, the wireless LAN key station being connected by an optical line to a higher-level network as the base station.

Although the present invention has been described hereinabove with reference to exemplary embodiments, the present invention is not limited to the above-described exemplary embodiments. The configuration and details of the present invention are open to various modifications within the scope of the present invention that will be clear to those skilled in the art.

This application claims the benefits of priority based on Japanese Patent Application No. 2011-004834, filed on Jan. 13, 2011, all of the disclosures of which are incorporated herein by reference.

REFERENCE SIGN LIST

10, M Master portable terminal;
11, 41 CPU;
12, 42 Digital baseband circuit;
13 to 16, and 43 to 46 RF circuit;
17, 18, 47, 48 Antenna;
19, 49 Data bus;
20, 50 Control bus;
21, 51 I/F circuit;
22, 52 Coaxial connector group;
40, S Slave portable terminal;
70, 90 RF reception processor;
71 RF transmission processor;
72, 92 Orthogonal demodulator;
73, 93 Low-noise amplifier;
74, 94 Band-pass filter;
75 Analog switch;
76 Duplexer; and
77, 78 Divider.

The invention claimed is:

1. A wireless communication device that communicates with a base station, comprising:

a plurality of terminals each comprising an antenna element and an RF circuit, one of said plurality of terminals being a master terminal and at least one remaining terminal being a slave terminal, wherein each said slave terminal is configured to be connected to said master terminal by an interface that comprises at least a high-frequency transmission path, wherein said master terminal further comprises a control unit and a MIMO processor to which said RF circuit is connected, wherein said control unit is configured to control said MIMO processor, said RF circuit of said master terminal, and said RF circuit of each said slave terminal and to cause said MIMO processor to execute MIMO reception processing based on an RF signal that is received by said antenna element of said master terminal and an RF signal that is received by said antenna element of each said slave terminal and transmitted to said master terminal by way of said high-frequency transmission path, wherein said master terminal further comprises:
  a plurality of said antenna elements;
  said RF circuit, which is configured for transmission and reception, that is provided for each of antenna elements of said master terminal and that is configured to carry out transmission and reception processing; and
  said RF circuit, which is configured for reception, that carries out only reception processing, wherein each said slave terminal further comprises:
  a plurality of said antenna elements; and
  said RF circuit, which is configured for transmission and reception, that is provided for each of said antenna elements of said slave terminal and that is configured to carry out transmission and reception processing, wherein the RF signal that is received at said antenna elements of each of said slave terminals is transmitted to said RF circuit configured for reception of said master terminal.

2. The wireless communication device as set forth in claim 1, wherein said plurality of terminals all separately have MIMO communication capability and, by means of said master terminal and said at least one slave terminal, are configured to execute MIMO communication of a higher-order spatial multiplicity than a spatial multiplicity of a MIMO communication capability of each individual terminal of said plurality of terminals.

3. The wireless communication device as set forth in claim 2, wherein said RF circuits for transmission and reception of said at least one slave terminal are each provided with an amplifier which is configured to amplify an RF signal from corresponding said antenna, and under control from said control unit, said RF signal that has been amplified by said amplifier is transmitted to said master terminal from said at least one slave terminal.

4. The wireless communication device as set forth in claim 1, wherein said RF circuits for transmission and reception of said at least one slave terminal are each provided with an amplifier which is configured to amplify an RF signal from corresponding said antenna, and under control from said control unit, said RF signal that has been amplified by said amplifier is transmitted to said master terminal from said at least one slave terminal.

5. The wireless communication device as set forth in claim 1, wherein, during call connection or when call connection is disconnected, said master terminal is configured to be made a slave terminal and any one of said slave terminal or slave terminals are configured to be made the master terminal at that time.

6. The wireless communication device as set forth in claim 1, comprising a plurality of said slave terminals, wherein said plurality of slave terminals are connected to said master terminal by one of: a connection configuration realized by daisy-chain connection; a connection configuration realized by one-to-many connection; and a connection configuration in which daisy-chain connection and one-to-many connection are combined.

* * * * *